(12) United States Patent
Das et al.

(10) Patent No.: US 12,113,682 B2
(45) Date of Patent: Oct. 8, 2024

(54) MACHINE LEARNING BASED TRAFFIC FLOW CONTROL FOR ADAPTIVE EXPERIMENTATIONS

(71) Applicant: Intuit Inc., Mountain View, CA (US)

(72) Inventors: Debasish Das, San Jose, CA (US); Babak Seyed Aghazadeh, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 925 days.

(21) Appl. No.: 17/163,152

(22) Filed: Jan. 29, 2021

(65) Prior Publication Data

US 2022/0247645 A1    Aug. 4, 2022

(51) Int. Cl.
| | |
|---|---|
| *G06N 20/00* | (2019.01) |
| *G06F 11/34* | (2006.01) |
| *G06F 11/36* | (2006.01) |
| *H04L 41/5041* | (2022.01) |
| *G06N 7/01* | (2023.01) |
| *H04W 28/02* | (2009.01) |

(52) U.S. Cl.
CPC ...... *H04L 41/5041* (2013.01); *G06F 11/3438* (2013.01); *G06F 11/3442* (2013.01); *G06F 11/3668* (2013.01); *G06N 20/00* (2019.01); *G06N 7/01* (2023.01); *H04W 28/02* (2013.01)

(58) Field of Classification Search
CPC ...... G06N 20/00; G06N 7/01; G06F 11/3438; G06F 11/3442; G06F 11/3668; G06F 11/3672; G06F 2201/81; G04L 41/5041; G04L 41/145; G04L 41/22; G04L 43/50; G04L 43/062; G04L 43/16; H04W 28/02
See application file for complete search history.

(56) References Cited

U.S. PATENT DOCUMENTS 11,113,715 B1 *  9/2021  Schmutz ................ H04L 67/02
11,748,647 B1 *  9/2023  Zeng ........................ G06N 5/01
                                                                706/11

OTHER PUBLICATIONS

Kuleshov, "Algorithms for the multi-armed bandit problem", Journal of Machine Learning Research 1, 2000. (Year: 2000).*

* cited by examiner

*Primary Examiner* — Dave Misir
(74) *Attorney, Agent, or Firm* — Paradice & Li LLP

(57) ABSTRACT

Systems and methods for controlling traffic flow for software experimentation are disclosed. An example method includes receiving a first traffic from a first plurality of users to receive an existing feature or a new feature, determining, from the first traffic, a first portion of the first plurality of users to receive the existing feature (with the first portion bounded by a first lower threshold and/or a first upper threshold) and a second portion of the first plurality of users to receive a new feature (with the second portion bounded by a second lower threshold and/or a second upper threshold). The method also includes providing the existing feature to the first portion, providing the new feature to the second portion, receiving feedback from the first plurality of users, and adjusting the first portion and/or the second portion based on the feedback and based on the bounds.

20 Claims, 3 Drawing Sheets

MACHINE LEARNING BASED TRAFFIC FLOW CONTROL FOR ADAPTIVE EXPERIMENTATIONS

TECHNICAL FIELD

This disclosure relates generally to machine learning based systems and methods for controlling traffic flow for adaptive experimentations.

DESCRIPTION OF RELATED ART

User software and online services are updated periodically to enhance the user experience. An update can include a plurality of new features to be added to a software or an online service. Before a new feature is added, the feature is alpha tested and beta tested. During testing by a group of users, use of the new feature is tested by a portion of the users, and use of the software or online service without the new feature is tested by another portion of the users. Feedback is received from the users based on their use of the software or service, and the feedback is processed to determine if inclusion of the new feature improves the user experience. Conventionally, control of user traffic to the software or service with or without the new feature is controlled manually to ensure a sufficient sample size of users for the software or service with and without the new feature. As software and services become more complex, the number of features that may be included in an update exponentially increases. As the number of features increase, managing traffic flow to test a feature becomes increasingly complex.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for controlling traffic flow for software experimentation. The example method includes receiving a first traffic from a first plurality of users (with each user of the first plurality of users to receive an existing feature or one of one or more new features in response to the system receiving the first traffic). The example method also includes determining, from the first traffic, a first portion of the first plurality of users to receive the existing feature (with the first portion to be bounded by one or more of a first lower threshold or a first upper threshold). The example method further includes determining, from the first traffic, a second portion of the first plurality of users to receive a first feature of the one or more new features (with the second portion to be bounded by one or more of a second lower threshold or a second upper threshold). The example method also includes providing the existing feature to the first portion of the first plurality of users, providing the first feature to the second portion of the first plurality of users, receiving feedback from the first plurality of users in response to providing the existing feature and the first feature, and adjusting one or more of the first portion or the second portion based on the feedback. The first portion is to remain bounded by one or more of the first lower threshold or the first upper threshold, and the second portion is to remain bounded by one or more of the second lower threshold or the second upper threshold. The method also includes receiving a second traffic from a second plurality of users (with each user of the second plurality of users to receive the existing feature or one of the one or more new features in response to the system receiving the second traffic). The method further includes providing one or more of the existing feature to an adjusted first portion of the second plurality of users or the first feature to an adjusted second portion of the second plurality of users.

In some aspects of the example method, the first portion and the second portion are included in a first apportionment of the traffic. The method may include adjusting a first apportionment to generate a next apportionment, which includes adjusting one or more of the first portion or the second portion. The method may also include adjusting the next apportionment one or more times to converge towards a final apportionment. The final apportionment includes a final first portion bounded by one or more of the first lower threshold or the first upper threshold and a final second portion bounded by one or more of the second lower threshold or the second upper threshold.

In some aspects, the method includes using a multi-arm bandit (MAB) solution to converge from the first apportionment towards the final apportionment. Converging towards the final apportionment may be based on increasing a reward associated with the MAB solution. In some aspects, converging towards the final apportionment is based on minimizing a Bregman divergence between an optimum apportionment without the bounds and the final apportionment. The MAB solution may include an epsilon-greedy solution.

In some aspects, the example method also includes determining whether a sum of portions in the first apportionment is not 100 percent of the traffic from the users and preventing determining the final apportionment based on the sum of portions not being 100 percent. The sum of portions may be based on the bounds of the first portion and the second portion.

In some aspects, the example method also includes adjusting one or more of the first lower threshold, the first upper threshold, the second lower threshold, or the second upper threshold. The example method may also include determining a new apportionment based on the one or more adjusted thresholds.

In some aspects, the example method also includes determining, from the first traffic, a third portion of the first plurality of users to receive a second feature from the one or more new features (with the third portion to be bounded by one or more of a third lower threshold or a third upper threshold). The example method may also include providing the second feature to the third portion of the first plurality of users, adjusting the third portion based on the feedback (with the third portion to remain bounded by one or more of the third lower threshold or the third upper threshold), and providing the second feature to an adjusted third portion of the second plurality of users. The first apportionment includes the third portion, adjusting the first apportionment includes adjusting the third portion, and the final apportionment includes a final third portion bounded by one or more of the third lower threshold or the third upper threshold.

Another innovative aspect of the subject matter described in this disclosure can be implemented in a system for controlling traffic flow for software experimentation. An example system includes an interface to perform operations including receiving a first traffic from a first plurality of users (with each user of the first plurality of users to receive an existing feature or one of one or more new features in response to the system receiving the first traffic), providing the existing feature to a first portion of the first plurality of users, providing a first feature of the one or more new features to a second portion of the first plurality of users, receiving feedback from the first plurality of users in response to providing the existing feature and the first feature, receiving a second traffic from a second plurality of users (with each user of the second plurality of users to receive the existing feature or one of the one or more new features in response to the system receiving the second traffic), and providing one or more of the existing feature to an adjusted first portion of the second plurality of users or the first feature to an adjusted second portion of the second plurality of users. The example system also includes one or more processors and a memory storing instructions that, when executed by the one or more processors, cause the system to perform operations. The operations include determining, from the first traffic, the first portion of the first plurality of users to receive the existing feature (with the first portion to be bounded by one or more of a first lower threshold or a first upper threshold), determining, from the first traffic, the second portion of the first plurality of users to receive the first feature (with the second portion to be bounded by one or more of a second lower threshold or a second upper threshold), and adjusting one or more of the first portion or the second portion based on the feedback. The first portion is to remain bounded by one or more of the first lower threshold or the first upper threshold, and the second portion is to remain bounded by one or more of the second lower threshold or the second upper threshold.

In some aspects, execution of the instructions causes the device to perform operations further including adjusting a first apportionment to generate a next apportionment (with the first apportionment including the first portion and the second portion and adjusting the first apportionment including adjusting one or more of the first portion or the second portion), and adjusting the next apportionment one or more times to converge towards a final apportionment. A final first portion is bounded by one or more of the first lower threshold or the first upper threshold, and a final second portion is bounded by one or more of the second lower threshold or the second upper threshold.

In some aspects, execution of the instructions causes the device to use a MAB solution to converge from the first apportionment towards the final apportionment. Converging towards the final apportionment may be based on increasing a reward associated with the MAB solution. In some aspects, converging towards the final apportionment is based on minimizing a Bregman divergence between an optimum apportionment without the bounds and the final apportionment. In some aspects, the MAB solution includes an epsilon-greedy solution.

In some aspects, execution of the instructions causes the device to determine whether a sum of portions in the first apportionment is not 100 percent of the traffic from the users, and prevent determining the final apportionment based on the sum of portions not being 100 percent. The sum of portions may be based on the bounds of the first portion and the second portion.

In some aspects, execution of the instructions causes the device to adjust one or more of the first lower threshold, the first upper threshold, the second lower threshold, or the second upper threshold. Execution of the instructions also may cause the device to determine a new apportionment based on the one or more adjusted thresholds.

In some aspects, the interface is to perform operations further including providing a second feature of the one or more new features to a third portion of the first plurality of users and providing the second feature to an adjusted third portion of the second plurality of users. Execution of the instructions may also cause the device to determine, from the first traffic, the third portion of the first plurality of users to receive the second feature (with the third portion to be bounded by one or more of a third lower threshold or a third upper threshold) and adjust the third portion based on the feedback (with the third portion to remain bounded by one or more of the third lower threshold or the third upper threshold). The first apportionment includes the third portion, adjusting the first apportionment includes adjusting the third portion, and the final apportionment includes a final third portion bounded by one or more of the third lower threshold or the third upper threshold.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
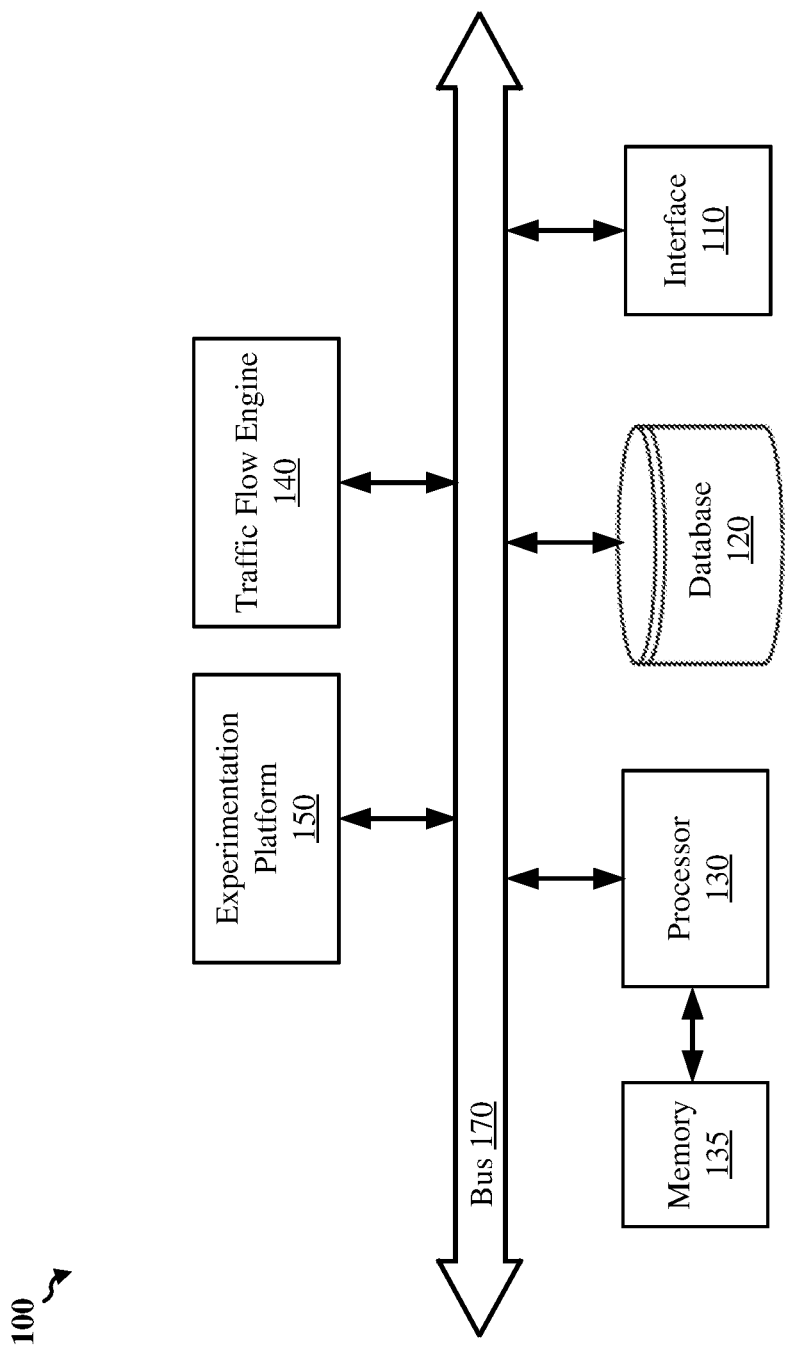
FIG. 1 shows an example system for managing traffic flow for adaptive experimentations, according to some implementations.

Implementations of the subject matter described in this disclosure may be used to manage traffic flow for software experimentation. A developer may generate a new feature for software or a service provided to users. As used herein, a feature is any aspect of the software or service that may be accessed by a user. Example features may include a menu, a window or pane, an arrangement of windows or panes, a banner, a chatbot interface, or other portions of a graphic user interface (GUI). Other example features may include audio, chatbot dialogue and decision making, an organization of portions of the software or service, or other portions of the software or service accessible by a user. As used herein, an example software or service (referred to in general as a "service" herein) may include a cloud-based application or other internet-based application, software as a service (SaaS), websites, or a browser plugin. For example, a company may provide online financial management tools or tax preparation software that are accessed by users via an internet browser.

For users accessing a service, traffic from the users' devices (such as a smartphone, tablet, or personal computer) are directed to a server hosting the service. The users then interact with the service, with traffic between the users and the service include requests and responses for different portions of the service. For example, the service may be an online accounting software, and a user may wish to access a business payment portion of the software to review payments received and made. The user's computer provides traffic to a server hosting the software, the server provides the business payment portion to the user's computer (to be displayed in an internet browser), and the user's computer provides a GUI of the business payment portion of the software. The user interacts with the software via the GUI (with call and response traffic occurring between the user device and the server) to review payments received and made.

Services are periodically updated. Some updates may be based on changes in federal or state requirements. For example, accounting software may be updated in light of changes to taxation law or other governing body mandates. Other updates may be to enhance the user experience. For example, a color scheme, organizational scheme, and so on of the accounting software may be updated to improve users' satisfaction with the software. In this manner, an existing feature may be replaced with a new feature to the service. For example, an existing chatbot, banner, or logo may be replaced with a new chatbot, banner, or logo via update to the service. As used herein, an existing feature may refer to a feature of the service as deployed. If a feature is not yet included in the deployed service, an existing feature may refer to the deployed service without the new feature or to a version of the feature previously tested and selected but not yet deployed in the service.

Conventional testing of an existing feature to one or more new features to determine which feature is preferred by users includes controlling traffic flows from users so that a different portion of users receives the existing feature or a new feature. Feedback is received from the users, and the feedback is processed to determine a preferred feature from the existing and one or more new features. The preferred feature may then be deployed for all users of the service. As used herein, feedback may refer to any suitable user interaction with the service. Example feedback may include user input associated with the feature (such as mouse clicks on a banner, typing in a chatbot, and so on), an amount of time the user interacts with the portion of the service including the new feature (such as the amount of time a mouse hovers over a banner, the amount of time the user interfaces with a chatbot, and so on), or manual feedback from a user about the feature (such as a user survey or direct comments from the user about the feature). Processing feedback may refer to any means to determine or measure a user sentiment of a feature based on the feedback. For example, longer times interacting with a feature may correspond to a higher user favorability of the feature.

Traffic flow control may be treated as an exploration/exploitation problem to determine how to divide user traffic between the existing feature and one or more new features. User sentiment of an existing feature is known based on previous interactions with the service including the existing feature. However, user sentiment of one or more new features is not known since the features are not yet deployed in the service. A system can exploit the known user sentiment of the existing feature while exploring the unknown user sentiments of the one or more new features. An A/B or A/B/n test may be created to determine how much traffic is to be provided to an existing feature ("A") or a new feature ("B"). "n" refers to more than one new feature existing, such as "C", "D", and so on. A machine learning model may be configured to solve the A/B or A/B/n test by determining a final apportionment of user traffic to the different features.

For example, the machine learning model may determine an initial apportionment of traffic so that each feature is provided to a portion of the users. The machine learning model may then adjust each portion of traffic (such as a percentage of traffic) associated with existing feature "A", new feature "B", and so on over time to maximize an overall user sentiment regarding the feature to converge to an optimal apportionment.

Many times, an optimal apportionment includes all or almost all users receiving one feature, with the other features (whether existing or new) being provided to no or almost no users. For example, in an A/B test, 50 percent of users initially may be provided the existing feature, and the other 50 percent of users initially may be provided the new feature. Over one or more iterations of receiving feedback and adjusting the percentages, a machine learning model may converge towards the new feature being provided to all users.

During testing, converging towards the optimal apportionment may cause one or more features to be provided to few users. As a result, little to no feedback may be received to further evaluate the feature. For example, quickly converging to providing the existing feature to all users may prevent a sufficient sample size of feedback to be received for the new feature in order to adequately evaluate the new feature.

In some implementations, the portions included in the apportionment (such as a percentage of users to receive the existing feature, a percentage of users to receive a first new feature, and so on) are bounded. In this manner, at least some users will receive the existing feature, and at least some users will receive the new feature. As a result, feedback may continue to be collected for each of the features. One benefit in bounding the portions is to ensure that solving the exploration/exploitation problem is not prematurely terminated. For example, an erroneous "optimal" solution may be determined by quickly converging to a feature based on limited sample sizes if the portions are not bounded. In this manner, a less favorable feature may be selected to be included in the service. Another benefit in bounding the portions is to increase the feedback for features for future use. For example, additional feedback on a feature less favorable than other features may provide insights as to why the feature is less favorable. The insights may then be used in designing future features.

Various implementations of the subject matter disclosed herein provide one or more technical solutions to the technical problem of determining features to be implemented in a service. Unlike conventional machine learning systems for testing potential features that converge to one feature, bounding the portions of users to receive each feature during testing allows additional feedback to be obtained. Various aspects of the present disclosure provide a unique computing solution to a unique computing problem that did not exist prior to beta testing of online software and services which requires controlling traffic flow from various users for different features that may be provided to a user. As such, implementations of the subject matter disclosed herein are not an abstract idea such as organizing human activity or a mental process that can be performed in the human mind. Training a traffic flow engine (such as a machine learning model) and using the engine to provide a feature to each user cannot be performed in the human mind, much less using pen and paper.

FIG. 1 shows an example system 100 for managing traffic flow for adaptive experimentations, according to some implementations. The system 100 includes an interface 110, a database 120, a processor 130, a memory 135 coupled to the processor 130, a traffic flow engine 140, and an experimentation platform 150. In some implementations, the various components of the system 100 may be interconnected by at least a data bus 170, as depicted in the example of FIG. 1. In other implementations, the various components of the system 100 may be interconnected using other suitable signal routing resources.

The interface 110 may be one or more input/output (I/O) interfaces to receive traffic from user devices and provide at least a portion of a service to the users. An example interface may include a wired interface or wireless interface to the internet or other means to communicably couple with user devices, a port to another device communicably coupled with the user devices, or other suitable means for communicating with user devices. For example, the interface 110 may include an interface with an ethernet cable to a modem, which is used to communicate with an internet service provider (ISP) directing traffic to and from user devices. As used herein, communicating with a "user" or receiving/providing traffic from/to a "user" may refer to communicating with the user's device (such as a smartphone, tablet, personal computer, or other suitable electronic device). The interface 110 may also include a display, a speaker, a mouse, a keyboard, or other suitable input or output elements that allow interfacing with the system 100 by a local user. The interface 110 is configured to receive traffic from users interfacing with a service hosted by the system 100 and provide traffic in response to the received traffic. In this manner, each user may use the service remotely. The traffic from users may include a request for a feature or portion of the service to include the feature. The traffic provided by the system 100 to each user may include the feature (whether the existing feature or a new feature being tested).

The database 120, which may represent any suitable number of databases, may store the service being hosted by the system 100. The database 120 may also store any information regarding the user traffic (such as who is logged into the service at the moment, saved files for a user, and so on), any information regarding a traffic flow engine 140 (such as a final apportionment for users to receive an existing feature or a new feature, an optimal apportionment, and so on), or any information regarding an experimentation platform 150 (such as which features are being tested). In some implementations, the database 120 may include a relational database capable of presenting the information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The traffic flow engine 140 may determine the users to receive an existing feature and users to receive one or more new features being tested in the experimentation platform 150. In some aspects, the traffic flow engine 140 includes one or more machine learning models to be trained in determining the apportionment of users to receive an existing feature or one or more new features. For example, the traffic flow engine 140 may include a machine learning model for each existing feature associated with one or more new features being tested in the experimentation platform 150. A machine learning model is trained based on the exploitation/exploration problem for the feature.

One example machine learning model to solve the exploitation/exploration problem is a multi-armed bandit (MAB) solution. A MAB solution is based on the multi-armed bandit problem in which a limited resource may be allocated among competing choices. The resource is the users to receive either the existing feature or a new feature being tested. The competing choices are the features themselves (with a user to receive only one of the features). For example, if ten users are to receive one of an existing webpage banner, a first alternative banner, or a second alternative banner being tested, the MAB solution attempts to apportion the ten users to receive one of the features in order to maximize an overall reward or gain. As used herein, the reward or gain may refer to an overall desirability or user sentiment associated with the apportionment of users for the different features. For example, feedback from each user may be converted into a sentiment score, and the sentiment scores may be combined (such as averaged, summed, or another suitable combination) to indicate an overall user sentiment associated with the current apportionment of users. To attempt to increase the overall user sentiment, the apportionment is adjusted, the features are provided to the users based on the apportionment, and feedback is received. The feedback is converted into an overall user sentiment. If the overall user sentiment does not increase, the previous apportionment may be kept or the apportionment may be adjusted again to attempt to increase the overall user sentiment. In some implementations, training the model includes iteratively adjusting the apportionment until the gain or reward (such as an overall user sentiment) does not increase more than a threshold amount over a consecutive number of iterations.

The MAB solution may include any suitable solution or strategy to solve the problem. Example solutions may include an epsilon-greedy solution, such as an epsilon-decreasing solution, a value difference based epsilon-greedy (VDBE) solution, or other types of epsilon-greedy solutions. Other example solutions may include Thompson-Sampling, Linear Associative Reinforcement Learning (LinRel), an Upper Confidence Bound (UCB) solution, a NeuralBandit solution (including one or more neural networks trained to model the reward system), or a Bandit Forest solution (based on a random forest built based on the rewards). While some example solutions are listed above, any suitable solution to solve the multi-armed bandit problem may be used for the machine learning model in the traffic flow engine 140.

In this manner, the traffic from the users may be received by the interface 110, and the traffic flow engine 140 may process the traffic to determine which users receive which feature. The traffic flow engine 140 may generate an apportionment based on the machine learning model, and the apportionment indicates how many users are to receive the existing feature and how many users are to receive a first new feature. If a second new feature exists (such as an existing banner and two alternative banners being tested), the apportionment also indicates how many users are to receive the second new feature. The apportionment may be configured for any number of features being tested (such as where n for an A/B/n test is an integer greater than or equal to 2, where n=2 indicates an A/B test, n=3 indicates an A/B/C test, and so on). In some implementations, how many users to receive a feature may be indicated as a percentage or other indication of a portion of the total number users.

Each portion of an apportionment is bounded by one or more thresholds. For example, the MAB solution may be configured to generate an apportionment based on the one or more thresholds. In some implementations, each portion may be associated with a lower threshold. In this manner, each feature of the existing or one or more new features is provided to at least a threshold number of users. For example, if features 1, 2, and 3 are being tested, a first portion associated with feature 1 (which may be the existing feature) may have a lower bound of 10 percent of total traffic, a second portion associated with feature 2 (which may be a first new feature) may have a lower bound of 15 percent of total traffic, and a second portion associated with feature 3 (which may be a second new feature) may have a lower bound of 15 percent of total traffic. In this manner, at least 10 percent of users receive feature 1, at least 15 percent of users receive feature 2, and at least 15 percent of users receive feature 3. Even if feature 1 is the preferred feature (such as providing the highest overall user sentiment if all users receive feature 1), the maximum percentage of users receiving feature 1 is 70 percent (with each of the other features still being provided to 15 percent of the users). As a result, feedback is still collected for feature 2 and feature 3 during testing.

In addition or alternative to lower thresholds, a portion may be bounded by an upper threshold. For the above example, the first portion may have an upper bound of 60 percent of total traffic. In this manner, no more than 60 percent of users are to receive feature 1. As a result, each portion is bounded by one or more of a lower threshold or an upper threshold. In some implementations, each portion is bounded by an upper threshold and a lower threshold. The lower thresholds may be the same or different across portions, and the upper thresholds may be the same or different across portions. In some implementations, each threshold may be set by a local user of the system 100 (such as via the interface 110). However, a threshold may be determined in any suitable manner, including being predefined. In training a MAB solution, the portions may be adjusted at any suitable time interval (such as every night, every week, and so on) in light of the thresholds. The thresholds and any generated apportionment from adjusting the portions may be stored in the database 120, the memory 135, or another suitable storage for use in training the MAB solution.

The traffic flow engine 140 may be implemented in software, hardware, or a combination thereof. In some implementations, the traffic flow engine 140 may be embodied in instructions that, when executed by the processor 130, cause the system 100 to perform operations associated with the traffic flow engine 140. The instructions may be stored in memory 135, the database 120, or another suitable memory.

The experimentation platform 150 includes a platform to design and test new features of the service. For example, the experimentation platform 150 may include a sandbox that is initially closed to others to allow development and debugging of possible new features. A feature may be encapsulated in a file, in a software call or header within a file, or in another suitable means. In some implementations, the experimentation platform 150 may allow multiple instances of the service to exist, with each instance including a different feature (such as one instance including the existing feature, another instance including a new feature, and so on). In some other implementations, the experimentation platform 150 includes multiple files associated with a feature (such as a first file for an existing feature, a second file for a first new feature, and so on). While the new features are developed and debugged, the existing feature is provided to the users. Once the new features are ready for testing, the portion of the experimentation platform 150 may be opened to test the new features compared to the existing feature. In this manner, users interface with a specific instance of the service, are provided with a specific file, or otherwise receive a specific feature based on the apportionment determined by the traffic flow engine 140. For example, the traffic includes requests for a feature. A first file is associated with an existing feature, a second file is associated with a first new feature, and so on. In this manner, the traffic requests a file associated with the feature, and the system 100 determines which file to provide to which user. Based on the apportionment, the system 100 determines which users receive the first file, which users receive the second file, and so on. In a specific example, a feature may be an existing webpage design or different new webpage designs being tested. Each webpage design may be included in a hypertext markup language (HTML) file. Which feature to be provided to a user includes which HTML file is to be provided to the user (such as a first HTML file for an existing feature, a second HTML file for a first new feature, and so on).

Feedback is received from the users, which is processed by the traffic flow engine 140 (as noted above) and may be used to adjust the current apportionment. In this manner, the number of accesses to the different files, to the different instances of the service, and so on in the experimentation platform 150 by users may be adjusted based on the adjusted apportionment. As used herein, a user being provided a specific feature may refer to a user device accessing a specific instance of the service including the specific feature, the user device receiving a specific file associated with the specific feature, or any other suitable means of providing the feature to the user.

The experimentation platform 150 may be implemented in software, hardware, or a combination thereof. In some implementations, the experimentation platform 150 may be embodied in instructions that, when executed by the processor 130, cause the system 100 to perform operations associated with the experimentation platform 150. The instructions may be stored in memory 135, the database 120, or another suitable memory.

The particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on. While the below examples are described below with reference to system 100, any suitable system may be used to perform the operations described herein.

Figure 2:
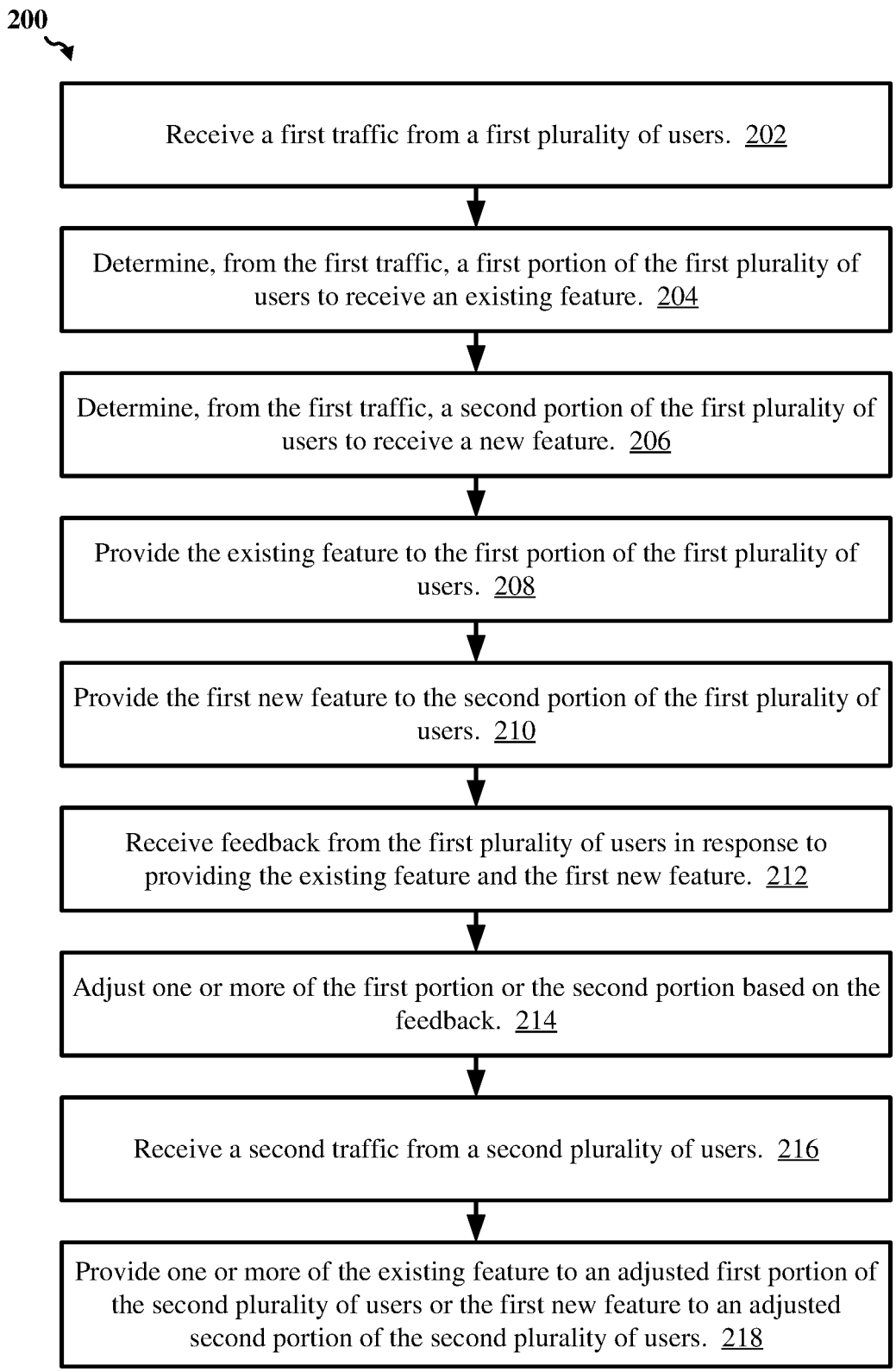
FIG. 2 shows an illustrative flow chart depicting an example operation for adjusting the portions of users to receive features being tested, according to some implementations.

FIG. 2 shows an illustrative flow chart depicting an example operation 200 for adjusting the portions of users to receive features being tested, according to some implementations. In describing the example operation 200 of FIG. 2, an example A/B test including the existing feature and a new feature is used. However, the operations described may be applied to any suitable A/B/n test (such as an A/B/C test, and A/B/C/D test, and so on).

At 202, the system 100 receives a first traffic from a first plurality of users. For example, the first plurality of users may request access to the feature being tested, and each user of the first plurality of users is to receive an existing feature or one of one or more new features in response to the system 100 receiving the first traffic. The first traffic may be received by the interface 110 and may include traffic from each of the users requesting the feature. For example, the traffic may include a call for an HTML file or another portion of the service including the feature.

At 204, the system 100 determines, from the first traffic, a first portion of the first plurality of users to receive the existing feature. At 206, the system 100 determines, from the first traffic, a second portion of the first plurality of users to receive a first new feature. For example, if the traffic includes a call for an HTML file including the feature, the first portion of users may be determined to receive a first HTML file including an existing feature, and the second portion of users may be determined to receive a second HTML file including the first new feature. If a second new feature exists (such as being included in a third HTML file), a third portion of users may be determined to receive the third HTML file. Portions of the users may be determined for each new feature that is to be tested.

Each portion is bounded by one or more of a lower threshold or an upper threshold. For example, portions may be indicated as percentages of the plurality of users (such as a first portion being a first percentage and a second portion being a second percentage). The first portion being bounded corresponds to the first percentage not being allowed to be less than a lower threshold percentage or greater than an upper threshold percentage. The thresholds may be provided by a local user or otherwise provided to the system 100. As noted above, the thresholds may be the same or different and may be any suitable threshold to bound a portion. With thresholds in place, it may be assured that each feature is provided to at least a threshold number of users for testing in order to receive feedback regarding the feature.

In some implementations, the traffic flow engine 140 (such as the processor 130 executing instructions of the traffic flow engine 140 included in software) determines a first apportionment, which includes the first portion and the second portion. If a second new feature exists, the first apportionment also includes the third portion. The first apportionment may also be referred to as an initial apportionment of the users. The first apportionment and subsequent apportionments are based on the bounds on the first portion and the second portion (and other portions that may exist).

The first apportionment is generated in any suitable manner. In one implementation, each portion associated with a new feature is set to a lower threshold and the first portion associated with the existing feature is set to the remainder of the users (as long as the upper threshold bounding the first portion is greater than the remainder). For example, in an A/B test, a first portion may be bounded between 10 percent and 90 percent, and a second portion may be bounded between 20 percent and 90 percent. The second portion is set to 20 percent, and the first portion is set to the remainder of 80 percent. In another implementation, the portions may be initially uniform (as long as the portions conform to the bounds for each portion). In this manner, approximately the same number of users initially receive the existing feature as the number of users that initially receive the first new feature. For example, in an A/B test, a first portion is set to 50 percent, and a second portion is set to 50 percent.

In some implementations, the first apportionment (and subsequent apportionments) is based on an epsilon-greedy solution. In this manner, an epsilon-greedy algorithm may be used to determine the portions based on an epsilon. Epsilon indicates a percentage of users for exploration of the new features being tested, and may be set by the system or a local user to a value less than 1. The existing feature may be provided to the remaining users (such as a percentage of users equal to 1−epsilon). In some implementations, if more than one new feature exists, the epsilon percentage of users may be evenly divided among the new features. For example, in an A/B/C test, 1−epsilon percentage of users receive the existing feature, 0.5*epsilon percentage of users receive a first new feature, and 0.5*epsilon percentage of users receive a second new feature. To ensure that the portions satisfy the bounds, epsilon may be set or adjusted so that 1−epsilon is between a first lower bound and a first upper bound, $$\frac{1}{n-1}$$

* epsilon is between a second lower bound and a second upper bound, and so on. In some other implementations, Thompson-sampling or other strategies may be used for determining the first apportionment (or subsequent apportionments).

The sum of the portions in the first apportionment (or any subsequent apportionment) is to be equal to the total number of users (in other words, equal to 100 percent of the plurality of users). For example, in an A/B test, the sum of the first portion and the second portion at any time is to equal 100 percent. In an A/B/C test, the sum of the first portion, the second portion, and the third portion is to equal 100 percent. If the sum of the portions do not equal 100 percent, the system 100 may prevent determining the final apportionment. For example, the traffic flow engine 140 determines that the sum of portions in an apportionment does not equal 100 percent. If less than 100 percent, the apportionment would cause some users to not receive a feature (which may cause an error in using the service). If greater than 100 percent, the apportionment would cause some users to be identified for receiving at least two instances of a feature (such as both the existing feature and a new feature, which may also cause an error in using the service). In determining that the sum is not 100 percent, the traffic flow engine 140 stops training the machine learning model, including not adjusting the portions to converge towards a final apportionment. In some implementations, the system 100 indicates an error to a local user and that the training to determine a final apportionment is stopped. If the system 100 prevents determining the final apportionment, the system 100 may use a last apportionment whose sum of portions equals 100 percent or may default to all users receiving the existing feature (thus pausing or terminating the test of the one or more new features).

The sum of the portions equaling 100 percent is based on the bounds of the first portion and the second portion. If a third portion or other portions exist, the sum equaling 100 percent may also be based on the bounds of the third portion or other portions. For example, before an A/B test begins, a local user provides a first lower threshold and a first upper threshold to bound a first portion associated with an existing feature. The local user also provides a second lower threshold and a second upper threshold to bound a second portion associated with a first new feature. The system 100 then determines from the thresholds whether the first portion and the second portion can sum to 100 percent. In one example, if a sum of the first upper threshold and the second upper threshold is less than 100 percent, the sum of the first portion and the second portion will always be less than 100 percent. In another example, if a sum of the first lower threshold and the second upper threshold is greater than 100 percent, the sum of the first portion and the second portion will always be greater than 100 percent. As a result, the system 100 prevents determining a final apportionment, and the system 100 indicates an error to the local user.

In some implementations, the system 100 requests different thresholds from the user. For example, the system 100 may indicate the error to the user (such as the upper thresholds summing to less than 100 percent), and the system 100 may request different thresholds from the user to correct the error (such as different upper thresholds that sum to more than 100 percent). In some other implementations, the system 100 may automatically adjust one or more of the thresholds. In this manner, one or more of the first lower threshold, the first upper threshold, the second lower threshold, or the second upper threshold is adjusted. The system 100 may thus determine a new apportionment based on the one or more adjusted thresholds, and the new apportionment may be used in training the machine learning model to converge towards a final apportionment. Similar to the first apportionment and other apportionments during training, the final apportionment includes a final first portion and a final second portion bounded by the thresholds.

Referring back to FIG. 2, at 208, the system 100 provides the existing feature to the first portion of the first plurality of users. In some implementations, the first apportionment is used by the system 100 to identify which users are to receive the existing feature. The portion of the service in the experimentation platform 150 including the existing feature is accessed, and the portion of the service is provided by the interface 110 to each of the identified users. For example, the identified users may access a portion of the experimentation platform 150 storing the existing feature (via traffic through the interface 110), or a file including the existing feature in the experimentation platform 150 is copied and provided to the identified users via the interface 110.

At 210, the system 100 provides the first new feature to the second portion of the first plurality of users. Similar to the first portion, the first apportionment may be used by the system 100 to identify which users are to receive the first new feature. The portion of the service in the experimentation platform 150 including the first new feature is accessed, and the portion of the service is provided by the interface 110 to each of the identified users. For example, the identified users may access a portion of the experimentation platform 150 storing the first new feature (via traffic through the interface 110), or a file including the first new feature in the experimentation platform 150 is copied and provided to the identified users via the interface 110.

At 212, the system 100 receives feedback from the first plurality of users in response to providing the existing feature and the first new feature. In some implementations, the user device reports metrics of the user interfacing with the service after providing the feature. For example, if the feature is a banner in a webpage, the user device may report whether the user clicks on or otherwise interacts with the banner. In some other implementations, the user device provides manual feedback from the user (such as comments, survey responses, or other manual inputs regarding the feature). The interface 110 receives the feedback (such as the metrics or manual feedback from the user devices) for processing by the system 100.

At 214, the system 100 adjusts one or more of the first portion or the second portion based on the feedback. In some implementations, the traffic flow engine 140 (such as the processor 130 executing instructions of the traffic flow engine 140 included in software) processes the feedback received by the interface 110 to determine to adjust the first apportionment including the first portion and the second portion. For example, for an MAB solution used to determine a final apportionment for an A/B/n test, the system 100 may determine an overall probability mass function (PMF) $\Theta$ for the different portions, which includes PMFs for each portion $[\Theta_1, \Theta_2, \ldots, \Theta_n]$. $\Theta$ is without reference to any thresholds to bound portions 1 through n. In this manner, $\Theta_1$ is without reference to a first lower threshold or a first upper threshold of the first portion, $\Theta_2$ is without reference to a second lower threshold or a second upper threshold of the second portion, and so on.

Each PMF may be based on a gain or reward determined using a MAB solution. For example, the gain may be a user sentiment metric. In this manner, $\Theta_1$ may be based on a user sentiment metric determined by the system 100 for the existing feature from previous feedback before testing or from the feedback received at step 212. $\Theta_2$ (and other PMFs for any other new features) may be based on a user sentiment metric determined by the system 100 for the first new feature from the feedback received at step 212. If the first portion and the second portion are bounded in the first apportionment, feedback is received for the existing feature and the first new feature to allow determining the user sentiment metrics (and thus the PMFs). If a user sentiment metric for an existing feature is higher than user sentiment metrics for the new features, the system 100 may determine $\Theta_1$ to skew to a higher value than other PMFs (such as having an apex closer to 100 percent than other PMFs). Conversely, if a user sentiment metric for an existing feature is lower than user sentiment metrics for the new features, the system 100 may determine $\Theta_1$ to skew to a lower value than other PMFs (such as having an apex closer to 0 percent than other PMFs). In this manner, the PMFs may be updated each iteration that feedback is received.

The bounds for portions 1 through n may be indicated as $(L,U)=[(L1,U1), (L2,U2), \ldots, (Ln,Un)]$, where "Lq" indicates a lower threshold and "Uq" indicates an upper threshold for each portion q from 1 to n. An optimal apportionment without reference to the bounds (including optimal portions 1 through n indicated as $y=[y_1, y_2, \ldots, y_n]$) may be determined directly from the PMFs in $\Theta$ for the portions. However, the apportionment to be determined by the MAB solution (including portions 1 through n indicated as $x=[x_1, x_2, \ldots, x_n]$) is based on the bounds $(L,U)=[(L1, U1), (L2,U2), \ldots, (Ln,Un)]$.

The system 100 attempts to minimize the difference between the apportionment x based on the bounds and the optimal apportionment y based on the updated PMFs after processing the feedback. In some implementations, the system 100 measures a divergence between potential apportionments x and the optimal apportionment y. Since y is directly based on Θ, the divergence may be a measurement between x and Θ. In this manner, the system 100 determines x by minimizing the divergence measurement. An example divergence measurement is a Bregman divergence between potential x's and Θ (which is associated with a convex function to indicate an apex at y). The system 100 uses the convex function to determine an x closest to y as the apportionment. The measurement may be visualized as a Euclidian distance between x and Θ. For example, for an A/B test, the determined apportionment is associated with the minimum two dimensional distance between a valid $x=[x_1, x_2]$ and $\Theta=[\Theta_1, \Theta_2]$ along the convex function curve.

The minimization problem between x and Θ is a quadratic problem with bounds (and equality constraints, such as to ensure the sum of the portions in x is 100 percent). The apportionment may be determined using a minimize function of the sum of the squares of absolute values of the differences (minimize $\|x-\Theta\|^2$, which equals minimize $(|x_1-\Theta_1|^2 + |x_2-\Theta_2|^2 + \dots)$). In some implementations, the minimize function is of the square root of the sum of the squares (minimize $(\{sum(|x-\Theta|^2)\}^{1/2})$). Solving the above minimization problem may be implemented in the system 100 using the scipy.optimize library in Python. In this manner, adjusting one of the first portion or the second portion based on the feedback includes determining the next apportionment x to be used. As noted above, the first portion after any adjustment is to remain bounded by one or more of the first lower threshold or the first upper threshold (such as by (L1,U1)), and the second portion is to remain bounded by one or more of the second lower threshold or the second upper threshold (such as by (L2, U2)). If a third portion exists (and so on), the third portion being adjusted includes determining the next apportionment x including the third portion. The third portion is to remain bounded by one or more of the third lower threshold or the third upper threshold (such as by (L3, U3)).

At 216, the system 100 receives a second traffic from a second plurality of users. For example, a second plurality of users request the feature. The second traffic refers to the user traffic after feedback is received and the portions are adjusted for providing the features. In some implementations, the portions may be adjusted daily or another suitable interval. For example, a first traffic is traffic for a first day, and a second traffic is traffic for a next day (with the portions updated each night until the final apportionment is determined). The second plurality of users may include at least some of the first plurality of users or may be completely exclusive. Each user of the second plurality of users is to receive the existing feature or one of the one or more new features in response to the system 100 receiving the second traffic. For example, similar to as described above with reference to steps 202-206, the system 100 processes the traffic to determine which users of the second plurality of users are to receive which feature (such as accessing a specific portion of the experimentation platform 150 or receiving a file associated with a specific feature).

At 218, the system 100 (such as the interface 110) provides one or more of the existing feature to an adjusted first portion of the second plurality of users or the first new feature to an adjusted second portion of the second plurality of users. For example, the apportionment x determined in step 214 includes the adjusted first portion and the adjusted second portion. The system 100 uses the apportionment x to determine which users receive the existing feature and which users receive the first new feature. If a second new feature is also being tested, the apportionment x includes an adjusted third portion, and the system 100 may use the apportionment x to determine which users receive the second new feature.

While not shown in FIG. 2, the system 100 may receive feedback in response to providing the features to the second plurality of users. The system 100 may adjust the portions based on processing the feedback and provide the features to a third plurality of users based on the adjusted portions. In this manner, the apportionment may be adjusted in an iterative manner so that the apportionment converges towards a final apportionment. The final apportionment includes a final first portion bounded by one or more of the first lower threshold or the first upper threshold (such as (L1,U1)) and a final second portion bounded by one or more of the second lower threshold or the second upper threshold (such as (L2,U2)). If the test includes a second new feature (or additional features being tested), the final apportionment includes a final third portion bounded by one or more of the third lower threshold or the third upper threshold (such as (L3,U3)).

Once a final apportionment is determined, the system 100 may continue testing the features based on the final apportionment (without further updating the final apportionment). In some other implementations, testing of the features may end, and one of the features may be selected and implemented into the service for deployment.

Figure 3:
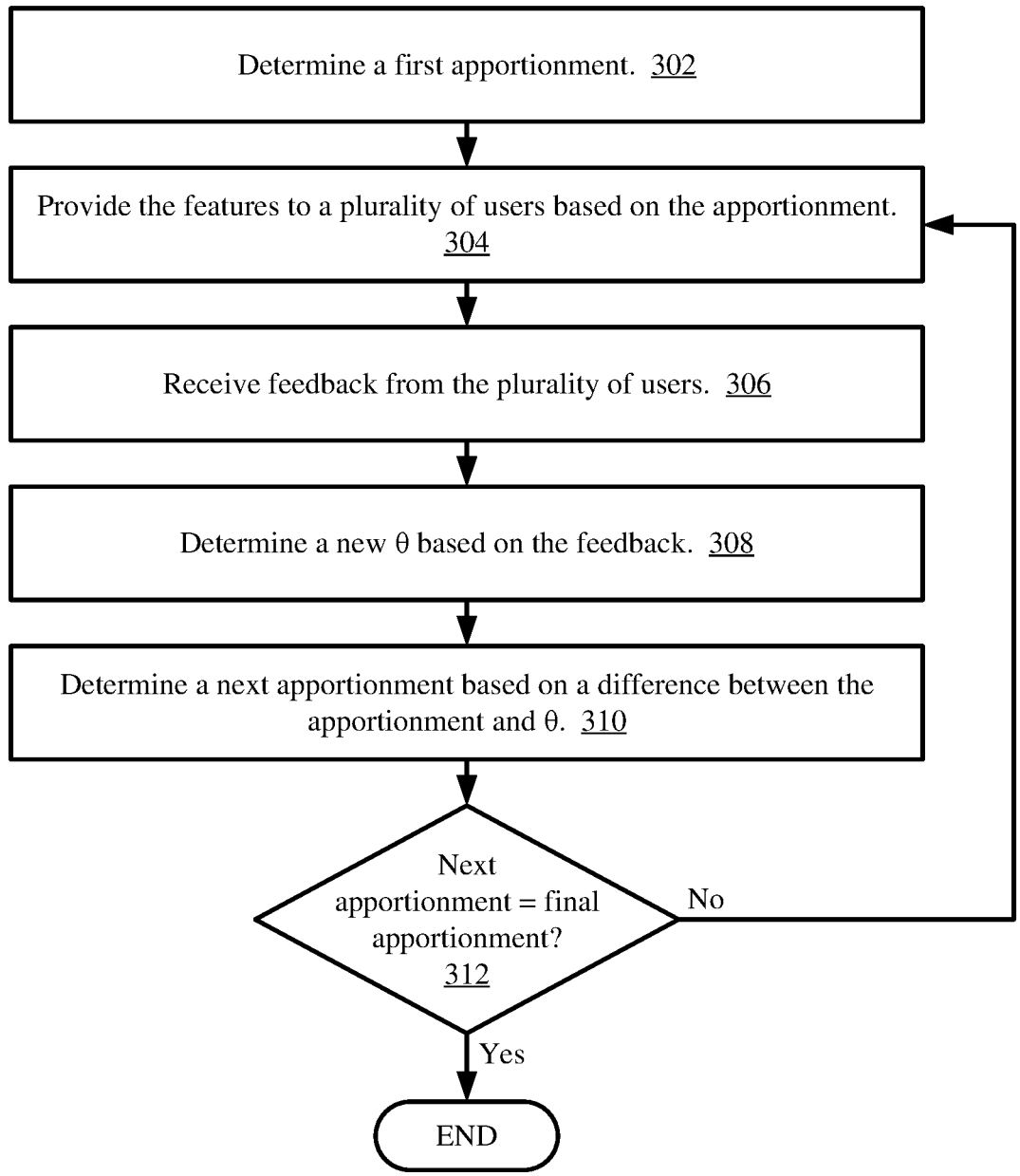
FIG. 3 shows an illustrative flow chart depicting an example operation for iteratively adjusting an apportionment to converge towards a final apportionment, according to some implementations.

FIG. 3 shows an illustrative flow chart depicting an example operation 300 for iteratively adjusting an apportionment to converge towards a final apportionment, according to some implementations. At 302, the system 100 determines a first apportionment. For example, the system 100 may use the epsilon from a greedy-epsilon solution to determine the first apportionment. At 304, the system provides the features to a plurality of users based on the apportionment. For example, the apportionment includes a first portion (associated with the existing feature) and a second portion (associated with a first new feature). The existing feature is provided to a first portion of the first plurality of users, and the first new feature is provided to a second portion of the first plurality of users. At 306, the system 100 receives feedback from the plurality of users regarding the specific feature provided to each user. For example, the first portion of users provides feedback regarding the existing feature, and the second portion of users provides feedback regarding the first new feature.

At 308, the system 100 determines a new PMF Θ based on the feedback. For example, one or more of $\Theta_1$ through $\Theta_n$ may be adjusted or different than the previous PMF based on the feedback. As noted above, the PMFs are determined without reference to the bounds of the portions. At 310, the system 100 determines a next apportionment based on a difference between the apportionment and the new PMF Θ. For example, the minimization problem described above (such as minimizing the Bregman divergence) is solved by determining an apportionment x that minimizes the divergence from Θ as the next apportionment.

At decision block 312, if the next apportionment is not the final apportionment, the process reverts back to step 304. If the next apportionment is the final apportionment, the process ends. In some implementations, the system 100 keeps track of the divergences determined for one or more previous apportionments. For example, the system 100 may store the determined divergences in the database 120 of the memory 135. For an iteration of steps 304 through 310, the system 100 may determine if the current divergence is less than the previous divergence by a threshold for a consecutive number of iterations. For example, the system 100 may determine if a fifth divergence (determined for a fifth apportionment) is less than a first divergence (determined for a first apportionment) by more than a threshold. The threshold may be user defined or predefined by the model. If the difference between the divergences is less than the threshold, the system 100 may determine the current apportionment to be the final apportionment. The threshold may be associated with the resource and time costs to continue adjusting the apportionments compared to the error between a desired final apportionment and the current apportionment. For example, determining the current apportionment to be the final apportionment may be based on the Adam optimization algorithm or stochastic gradient descent. As noted above, each iteration of steps 304 through 310 may be performed at a time interval. For example, the apportionments may be adjusted daily based on feedback from the previous day. In this manner, steps 304 through 310 may be repeated daily (or at another suitable time interval) until the final apportionment is determined.

While not shown in FIG. 3, the system 100 may use the final apportionment to continue providing the features to users. At some point, a local user may decide to end the test of the new features. The feedback and final apportionment may be used to determine the feature to be deployed in the service. The deployed feature thus becomes the existing feature in case new features associated with the existing feature are to be tested in the future.

As noted above, the use of bounds allows feedback to continue to be accumulated for each feature during testing. More robust feedback allows for a more informed selection of the feature for deployment. More robust feedback may also be used to influence future tests (such as to influence the selection of epsilon for an epsilon-greedy solution of a MAB solution for a future test).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A computer-implemented method for controlling traffic flow for software experimentation, comprising:
 receiving a first traffic from a first plurality of users, wherein each user of the first plurality of users is to receive an existing feature or one of one or more new features in response to receiving the first traffic;
 determining, from the first traffic, a first portion of the first plurality of users to receive the existing feature, wherein the first portion is to be bounded by one or more of a first lower threshold or a first upper threshold;
determining, from the first traffic, a second portion of the first plurality of users to receive a first feature of the one or more new features, wherein the second portion is to be bounded by one or more of a second lower threshold or a second upper threshold;
providing the existing feature to the first portion of the first plurality of users;
providing the first feature to the second portion of the first plurality of users;
receiving feedback from the first plurality of users in response to providing the existing feature and the first feature;
generating a user sentiment from the feedback;
adjusting one or more of the first portion or the second portion to increase the user sentiment based on a next feedback, wherein:
the first portion is to remain bounded by one or more of the first lower threshold or the first upper threshold;
the second portion is to remain bounded by one or more of the second lower threshold or the second upper threshold; and
a machine learning model using a multi-arm bandit (MAB) solution adjusts the one or more of the first portion or the second portion and bounds the first portion and the second portion;
receiving a second traffic from a second plurality of users, wherein each user of the second plurality of users is to receive the existing feature or one of the one or more new features in response to receiving the second traffic; and
providing one or more of:
the existing feature to an adjusted first portion of the second plurality of users; or
the first feature to an adjusted second portion of the second plurality of users.

2. The method of claim 1, further comprising:
adjusting a first apportionment to generate a next apportionment, wherein:
the first apportionment includes the first portion and the second portion; and
adjusting the first apportionment includes adjusting one or more of the first portion or the second portion; and
adjusting the next apportionment one or more times to converge towards a final apportionment, wherein the final apportionment includes:
a final first portion bounded by one or more of the first lower threshold or the first upper threshold; and
a final second portion bounded by one or more of the second lower threshold or the second upper threshold.

3. The method of claim 2, further comprising using the MAB solution to converge from the first apportionment towards the final apportionment.

4. The method of claim 3, wherein converging towards the final apportionment is based on increasing a reward associated with the MAB solution.

5. The method of claim 4, wherein converging towards the final apportionment is based on minimizing a Bregman divergence between an optimum apportionment without the bounds and the final apportionment.

6. The method of claim 5, wherein the MAB solution includes an epsilon-greedy solution.

7. The method of claim 2, further comprising:
determining whether a sum of portions in the first apportionment is not 100 percent; and
preventing determining the final apportionment based on the sum of portions not being 100 percent.

8. The method of claim 7, wherein the sum of portions is based on the bounds of the first portion and the second portion.

9. The method of claim 2, further comprising:
adjusting one or more of the first lower threshold, the first upper threshold, the second lower threshold, or the second upper threshold; and
determining a new apportionment based on the one or more adjusted thresholds.

10. The method of claim 2, further comprising:
determining, from the first traffic, a third portion of the first plurality of users to receive a second feature from the one or more new features, wherein the third portion is to be bounded by one or more of a third lower threshold or a third upper threshold;
providing the second feature to the third portion of the first plurality of users;
adjusting the third portion based on the feedback, wherein the third portion is to remain bounded by one or more of the third lower threshold or the third upper threshold; and
providing the second feature to an adjusted third portion of the second plurality of users, wherein:
the first apportionment includes the third portion;
adjusting the first apportionment includes adjusting the third portion; and
the final apportionment includes a final third portion bounded by one or more of the third lower threshold or the third upper threshold.

11. A system for controlling traffic flow for software experimentation, comprising:
an interface to perform operations comprising:
receiving a first traffic from a first plurality of users, wherein each user of the first plurality of users is to receive an existing feature or one of one or more new features in response to the system receiving the first traffic;
providing the existing feature to a first portion of the first plurality of users;
providing a first feature of the one or more new features to a second portion of the first plurality of users;
receiving feedback from the first plurality of users in response to providing the existing feature and the first feature;
receiving a second traffic from a second plurality of users, wherein each user of the second plurality of users is to receive the existing feature or one of the one or more new features in response to the system receiving the second traffic; and
providing one or more of:
the existing feature to an adjusted first portion of the second plurality of users; or
the first feature to an adjusted second portion of the second plurality of users;
one or more processors; and
a memory storing instructions that, when executed by the one or more processors, cause the system to perform operations comprising:
determining, from the first traffic, the first portion of the first plurality of users to receive the existing feature, wherein the first portion is to be bounded by one or more of a first lower threshold or a first upper threshold;
determining, from the first traffic, the second portion of the first plurality of users to receive the first feature, wherein the second portion is to be bounded by one or more of a second lower threshold or a second upper threshold; and generating a user sentiment from the feedback;

adjusting one or more of the first portion or the second portion to increase the user sentiment based on a next feedback, wherein:

the first portion is to remain bounded by one or more of the first lower threshold or the first upper threshold;

the second portion is to remain bounded by one or more of the second lower threshold or the second upper threshold; and a machine learning model using a multi-arm bandit (MAB) solution adjusts the one or more of the first portion or the second portion and bounds the first portion and the second portion.

12. The system of claim 11, wherein execution of the instructions causes the system to perform operations further comprising:

adjusting a first apportionment to generate a next apportionment, wherein:

the first apportionment includes the first portion and the second portion; and adjusting the first apportionment includes adjusting one or more of the first portion or the second portion; and adjusting the next apportionment one or more times to converge towards a final apportionment, wherein the final apportionment includes:

a final first portion bounded by one or more of the first lower threshold or the first upper threshold; and a final second portion bounded by one or more of the second lower threshold or the second upper threshold.

13. The system of claim 12, wherein execution of the instructions causes the system to perform operations further comprising:

using the MAB solution to converge from the first apportionment towards the final apportionment.

14. The system of claim 13, wherein converging towards the final apportionment is based on increasing a reward associated with the MAB solution.

15. The system of claim 14, wherein converging towards the final apportionment is based on minimizing a Bregman divergence between an optimum apportionment without the bounds and the final apportionment.

16. The system of claim 15, wherein the MAB solution includes an epsilon-greedy solution.

17. The system of claim 12, wherein execution of the instructions causes the system to perform operations further comprising:

determining whether a sum of portions in the first apportionment is not 100 percent; and preventing determining the final apportionment based on the sum of portions not being 100 percent.

18. The system of claim 17, wherein the sum of portions is based on the bounds of the first portion and the second portion.

19. The system of claim 12, wherein execution of the instructions causes the system to perform operations further comprising:

adjusting one or more of the first lower threshold, the first upper threshold, the second lower threshold, or the second upper threshold; and determining a new apportionment based on the one or more adjusted thresholds.

20. The system of claim 12, wherein:

the interface is to perform operations further comprising:

providing a second feature of the one or more new features to a third portion of the first plurality of users; and providing the second feature to an adjusted third portion of the second plurality of users; and execution of the instructions causes the device to perform operations further comprising:

determining, from the first traffic, the third portion of the first plurality of users to receive the second feature, wherein the third portion is to be bounded by one or more of a third lower threshold or a third upper threshold; and adjusting the third portion based on the feedback, wherein the third portion is to remain bounded by one or more of the third lower threshold or the third upper threshold, wherein:

the first apportionment includes the third portion;

adjusting the first apportionment includes adjusting the third portion; and the final apportionment includes a final third portion bounded by one or more of the third lower threshold or the third upper threshold.

* * * * *